United States Patent [19]

Komatsu et al.

[11] Patent Number: 5,080,055
[45] Date of Patent: Jan. 14, 1992

[54] VARIABLE VALVE TIMING ARRANGEMENT FOR INTERNAL COMBUSTION ENGINE

[75] Inventors: Hiroshi Komatsu, Zushi; Kozaburo Okawa, Yokohama; Yutaka Matayoshi, Yokosuka; Shigeru Kamegaya, Tokyo, all of Japan

[73] Assignee: Nissan Motor Company, Ltd., Yokohama, Japan

[21] Appl. No.: 506,987

[22] Filed: Apr. 10, 1990

[30] Foreign Application Priority Data

Apr. 13, 1989 [JP] Japan .................................. 1-93334

[51] Int. Cl.⁵ ................................................ F01L 1/34
[52] U.S. Cl. ................................. 123/90.17; 123/90.18; 123/90.11
[58] Field of Search ............... 123/90.11, 90.15, 90.16, 123/90.17, 90.18, 90.6

[56] References Cited

U.S. PATENT DOCUMENTS

| | | | |
|---|---|---|---|
| 3,730,150 | 5/1973 | Codner, Jr. ...................... | 123/90.18 |
| 4,580,533 | 4/1986 | Oda et al. ........................ | 123/90.16 |
| 4,696,265 | 9/1987 | Nohira ............................. | 123/90.16 |
| 4,708,101 | 11/1987 | Hara et al. ....................... | 123/90.16 |
| 4,753,198 | 6/1988 | Heath .............................. | 123/90.18 |
| 4,759,321 | 7/1988 | Matsumoto et al. ............. | 123/90.15 |
| 4,765,288 | 8/1988 | Linder et al. .................... | 123/90.16 |
| 4,844,022 | 7/1989 | Konno ............................. | 123/90.17 |

Primary Examiner—Raymond A. Nelli
Assistant Examiner—Weilun Lo
Attorney, Agent, or Firm—Pennie & Edmonds

[57] ABSTRACT

A schedule which is logged in terms of engine speed and which is divided into a number of engine operational zones, is used to determine the amount of axial displacement should be induced in a cam shaft on which a specially shaped cam is mounted. The cam has a first section which configured to simultaneously induce a change in valve lift and the valve closure timing, and a second section which maintains the valve closure timing at essentially a fixed value and induces a further increase in valve lift.

2 Claims, 11 Drawing Sheets

(VALVE LIFT)

VALVE CLOSING TIMING

FIG. 8

| MODE | O/L | IVC | LIFT |
|---|---|---|---|
| STABLE IDLING | SMALL | EARLY | LOW |
| PARTIAL LOAD | SMALL | EARLY, (DELAYED) | LOW-MID |
| LOW/MEDIUM SPEED TORQUE | SMALL | EARLY | MID |
| MAX TORQUE OUTPUT | LARGE | DELAYED | HIGH |

(VALVE LIFT)

(VALVE TIMING)

CRANK ANGLE

CRANK ANGLE

VARIABLE VALVE TIMING ARRANGEMENT FOR INTERNAL COMBUSTION ENGINE

BACKGROUND OF THE INVENTION

1. Field of the Invention

The present invention relates generally to variable valve timing arrangements for internal combustion engines and more specifically to a control arrangement via which a cam shaft cam be selectively moved in its axial direction.

2. Description of the Prior Art

FIG. 13 shows a previously proposed arrangement which was disclosed in the May edition of the MTZ (Motortechnische Zeitschrift). As shown, this arrangement is applied to a direct drive type overhead cam arrangement which obviates the need for rocker arms by arranging for the tops of the valve lifters or tappets 1 to directly engage with their respective motivating cams 2.

In the illustrated arrangement, flat plate plate-like members 4 are pivotally disposed at the tops of the lifters 1 and arranged to act as cam followers. The cams 2 are formed on a cam shaft 6 which is selectively displaceable in its axial direction by the actuator arrangement generally denoted by the numeral 8.

The actuator 8 is disposed within a hollow drive pulley 10 which is operatively connected with the engine crankshaft of the engine by way of a cogged belt (neither shown).

One end of the cam shaft 6 is splined and arranged to be received in a correspondingly internally splined sleeve-like cylinder 12. A variable volume control chamber 14 is defined in the cylinder by the splined end of the cam shaft 6. The cylinder 12 is connected with the body of the pulley 10 so as to undergo synchronous rotation therewith and is formed with a supply port 16 via which the control chamber 13 fluidly communicates with a non-illustrated source of hydraulic fluid under pressure.

The cam shaft is formed with a coaxial bore 18 via which lubricating hydraulic fluid is supplied to the surfaces of the cams 2 and the like which undergo relative rotation with respect to one another.

The actuator 8 includes an exhaust port 20 via which the hydraulic fluid which is introduced into the control chamber 14 is controllably drained therefrom. A seal 22 is provided on the cam shaft adjacent the splining and arranged to sealingly engage the inner surface of the cylinder. A stopper 24 is provided on the cam shaft. This stopper is arranged to engage a flange 26 formed at the end of the cylinder 12 and thus limit the degree to which the cam shaft 6 may slide into the cylinder 12.

By controlling the amount of hydraulic fluid which is supplied to the supply port 16, the amount of fluid which is retained in the chamber 14 and the amount of axial displacement of the cam shaft 6 is controlled.

The splines formed on the cam shaft and in the cylinder are arranged to induce a predetermined amount of relative rotation between the cam shaft 6 and the sleeve 12 as the cam shaft 6 is axially displaced.

The cams 2 have an essentially frusto-conical configuration and are arranged in this instances so that they taper in the direction of the actuator 8.

This configuration, in combination with the relative rotation which occurs between the cam shaft and the sleeve-like cylinder permits both the amount and the timing of the lift which is induced in the valves, to be varied in accordance with the amount of axial displacement of the cam shaft.

However, this arrangement has encountered a drawback in that it is difficult to appropriately control the amount of displacement over a wide range of engine operating conditions.

For example, it is required that large amounts of torque be produced when the engine throttle valve is wide open, while promoting efficient combustion which reduces noxious emissions under partial load-medium/low engine speed modes of operation.

SUMMARY OF THE INVENTION

It is an object of the present invention to provide a control arrangement for the above type of VVT which improves the valve control in a manner which enables the development of large amounts of torque under full throttle and which particularly improves combustion and torque output characteristics at relatively low engine speeds and loads.

In brief, the above object is achieved by an arrangement wherein a schedule which is logged in terms of engine speed and which is divided into a number of engine operational zones, is used to determine the amount of axial displacement should be induced in a cam shaft on which a specially shaped cam is mounted. The cam has a first section which is configured to simultaneously induce a change in valve lift and the valve closure timing, and a second section which maintains the valve closure timing at essentially a fixed value and induces a further increase in valve lift. By selectively controlling the amount of displacement of the shaft, different valve lift and timing characteristics can be achieved.

More specifically, a first aspect of the present invention is deemed to come in an internal combustion engine which features: a first sensor which senses a parameter which varies with engine speed; a second sensor which senses a parameter which varies with engine load; a variable valve timing device which controls the opening timing and amount of lift of an valve associated with a combustion chamber of the engine; and a control circuit which is responsive to the first and second sensors and which is operatively connected with the variable valve timing device, the control circuit including a control schedule which is divided more than two driving zones, the first of the zones being a high load zone wherein the maximum lift of the valve is induced at an essentially fixed relatively late valve closure timing, the second of the zones being a partial zone wherein the engine load is low and the valve lift is relatively small and valve closure induced at a relatively early timing.

According to a secured aspect of the present invention an internal combustion engine features the provision of: a first sensor for sensing engine speed; a second sensor for sensing engine load; a cam shaft; an actuator operatively connected with the cam shaft, the actuator being arranged to axially displace the cam shaft in its axial direction; a control unit operatively connected with the first sensor, the second sensor and the actuator, the control circuit including control schedule which recorded in terms of engine speed and engine load and which is divided into a plurality of control zones, each of the control zones determining the amount of axial displacement which is induced in the cam shaft by the actuator; a cam fixedly disposed on the cam shaft, the cam having a predetermined configuration and arranged to actuate valve means, the cam having first and second sections, the first section being arranged to simultaneously induce different lift and different valve closure timing as it is moved relative to the valve means by the axial displacement of the cam shaft within a first axial displacement predetermined range, the second section being arranged to induced increasing amounts of valve lift with essentially the same valve closure timing as it is moved relative to the valve means by the axial displacement of the cam shaft within a second predetermined axial displacement range.

BRIEF DESCRIPTION OF THE DRAWINGS

FIG. 8 is a table which shows the various overlap, inlet valve closure timing and lift values which are required to optimize four different modes of engine operation;

DETAILED DESCRIPTION OF THE PREFERRED EMBODIMENTS

Figure 2:
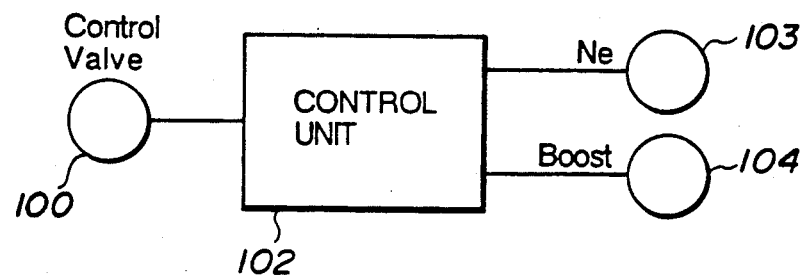
FIG. 2 is a block diagram showing a sensor/control unit/control valve arrangement used in connection with the present invention.
Figure 13:
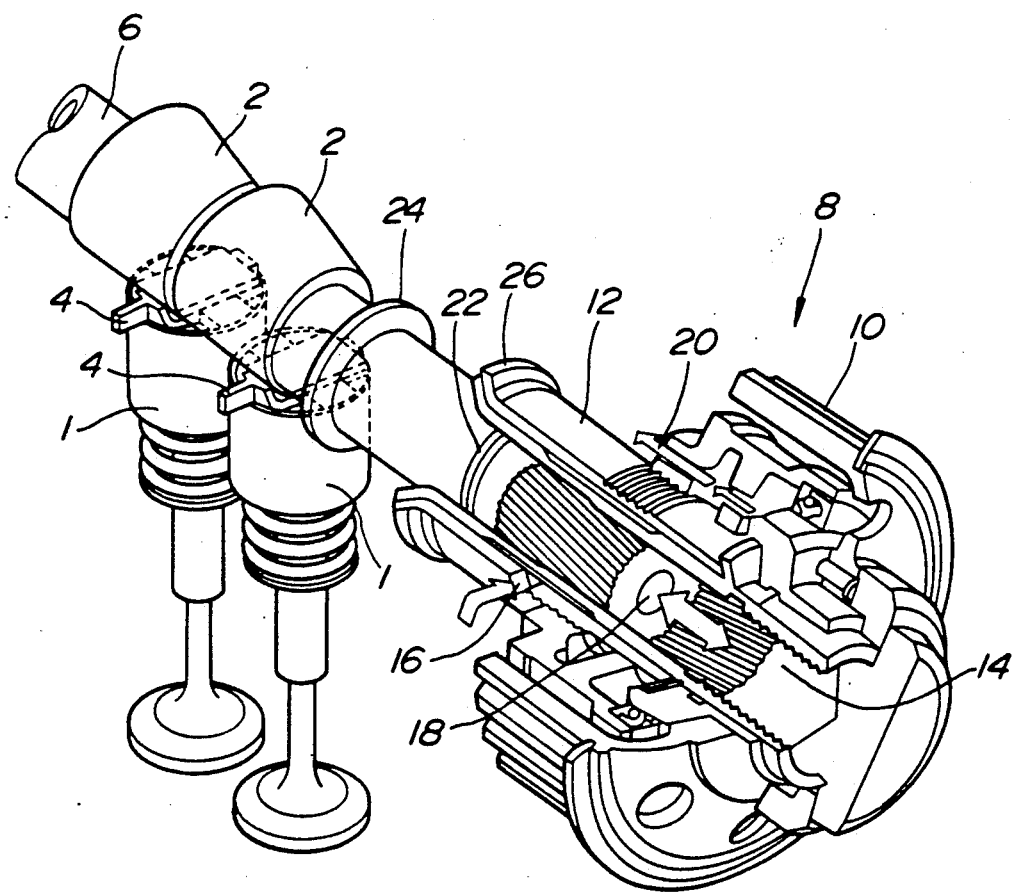
FIG. 13 shows the prior art VVT arrangement which was discussed in the opening paragraphs of the instant disclosure and to which an embodiment of the instant invention is applied.

In order to control the VVT (variable valve timing) arrangement shown in FIG. 13 it is necessary to control the supply of the hydraulic fluid to the control chamber 14. This supply is controlled by a spool valve type arrangement 100. This valve is schematically depicted in FIG. 2. By way of example only, this valve can be equipped with a solenoid to control the modulating action thereof.

Figure 1:
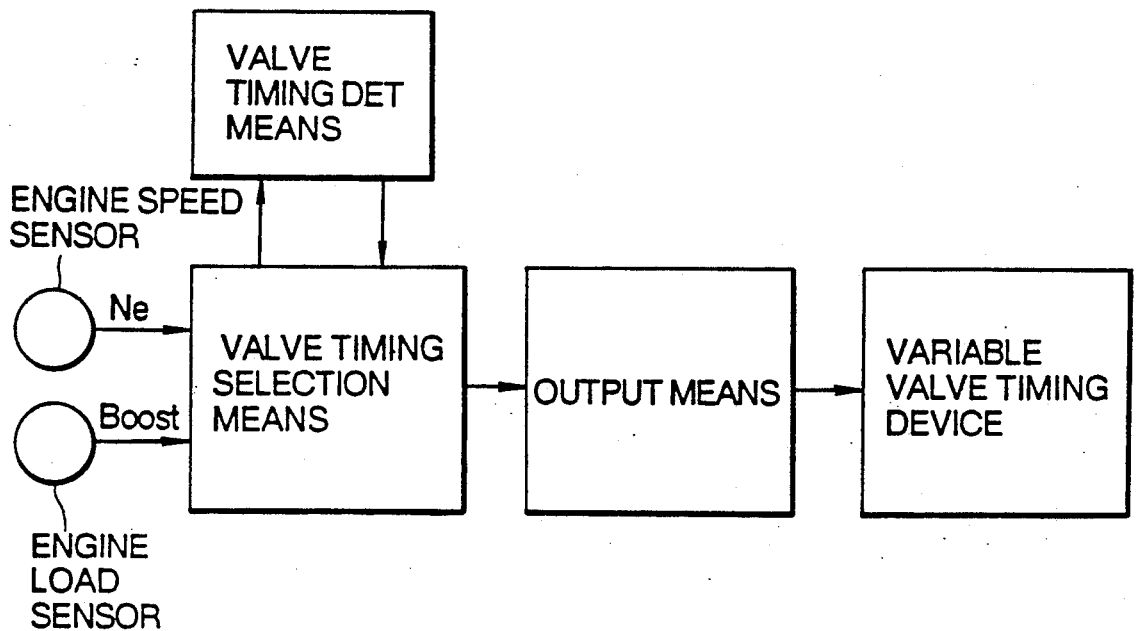
FIG. 1 is a schematic functional block diagram showing the conceptual arrangement of the instant invention.

A control unit 102 is operatively connected with an engine speed sensor 103 and an engine induction pressure or boost pressure sensor 104. In this instance the control unit 102 includes a microprocessor (not shown) which provides the functions illustrated in the blocks shown in FIG. 1.

Figure 3:
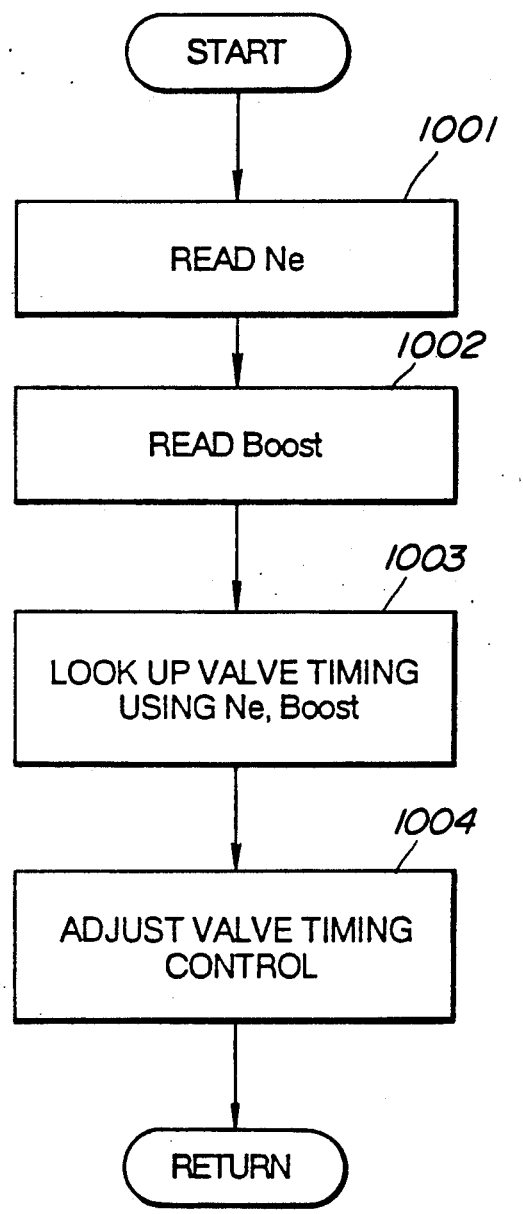
FIG. 3 is a flow chart which shows the steps which characterize the operation of the invention.

FIG. 3 shows in flow chart form the steps which are executed by a control program stored in the microprocessor. As will be readily appreciated, steps 1001 and 1002 read the engine speed and boost sensor outputs (Ne, Boost) and then place the same in memory for further processing. The data obtained in steps 1001 and 1002 is used to perform a table look-up using mapped data of the nature shown in FIGS. 4 and 5. In accordance with the results of the look-up operation, a suitable control signal produced and issued to the control valve 100.

Figure 4:
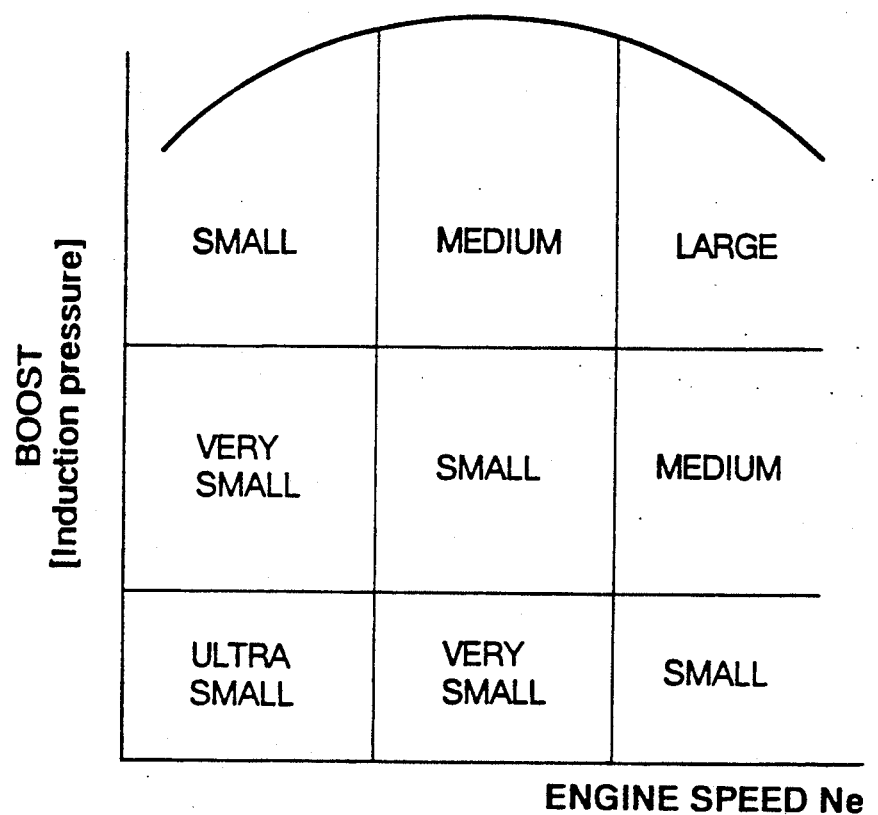
FIGS. 4 and 5 show valve lift and valve timing data which is recorded in terms of induction pressure and engine speed.
Figure 5:
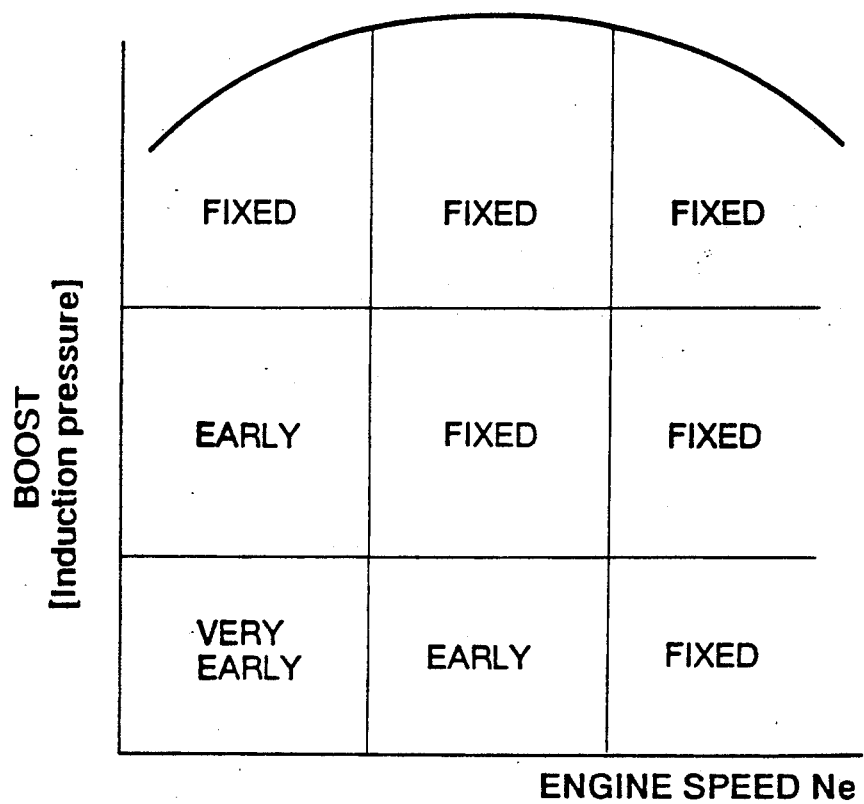

The map shown in FIG. 4 depicts the various amounts of lift which are required to be induced in the inlet valve for the given engine speed/load mode of operation, while that shown in FIG. 5 depicts the timing with which the valve should be closed. The maps are logged in terms of engine speed and engine boost pressure.

As shown in these figures, when the engine is operating under high load and high engine speed the valve lift and closure timing is maximized, while under partial load and low engine speed the inlet valve is required to undergo a reduced amount of lift and to be closed at an earlier timing as compared with high speed/load operation. It should be noted that in FIG. 4 Small > Very Small > Ultra Small. In FIG. 5 "Very Early" is earlier than "Early" which is earlier than "Fixed".

Figure 6:
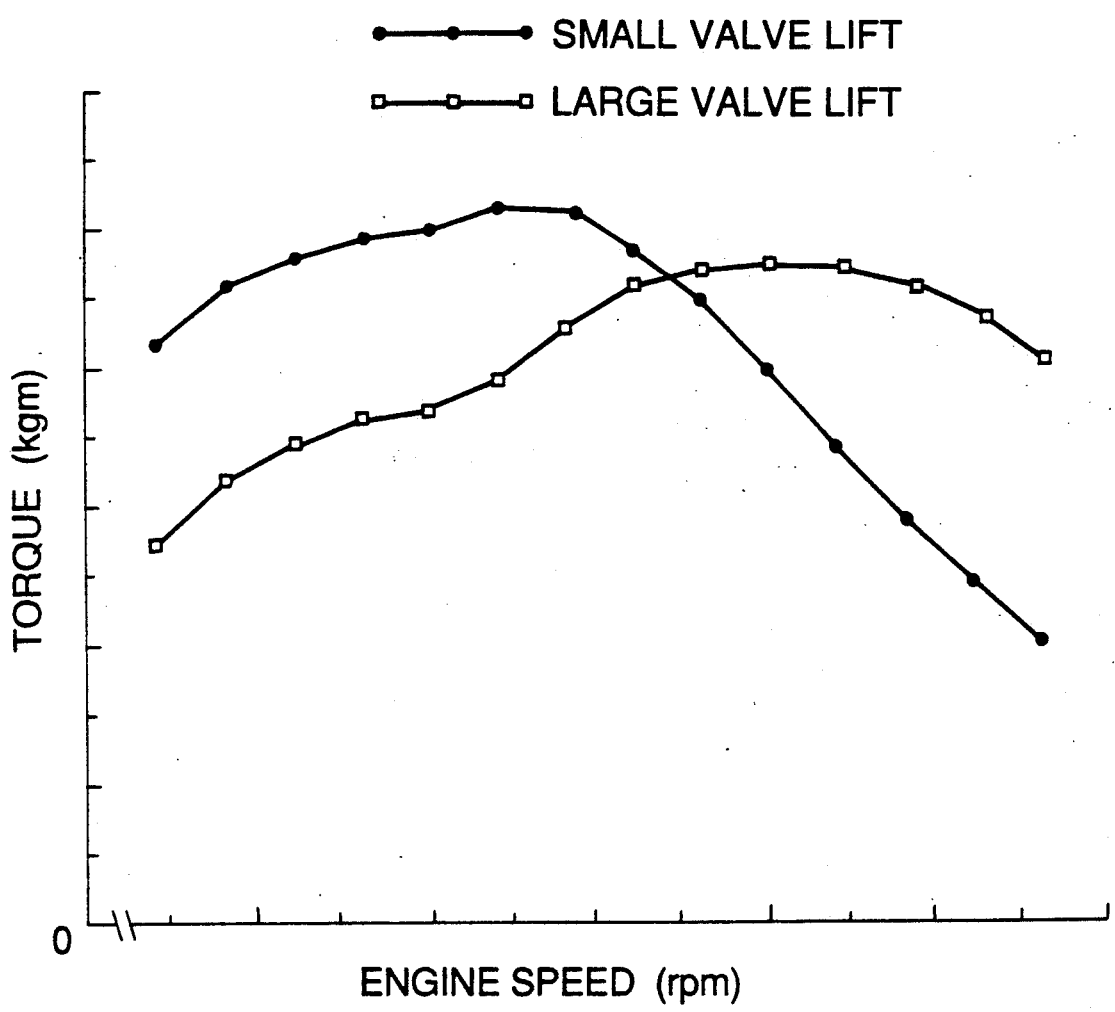
FIG. 6 is a graph recorded in terms of engine torque and engine speed which shows the effect of valve lift on the amount of torque which is produced by the engine.

In FIGS. 6 the engine power output characteristics which are achieved when the valve timing is held essentially constant and the amount of lift is small is indicated by the trace which follows the black dots while the characteristics which are achieved with the valve timing is held essentially constant and the amount of lift increased to a relatively large amount, is indicated by the trace which follows the white dots.

As will be appreciated, the small valve lift produces superior torque output at low engine speeds while that produced by the large lift gradually increases and maximizes in the relatively high engine speed region.

Figure 7:
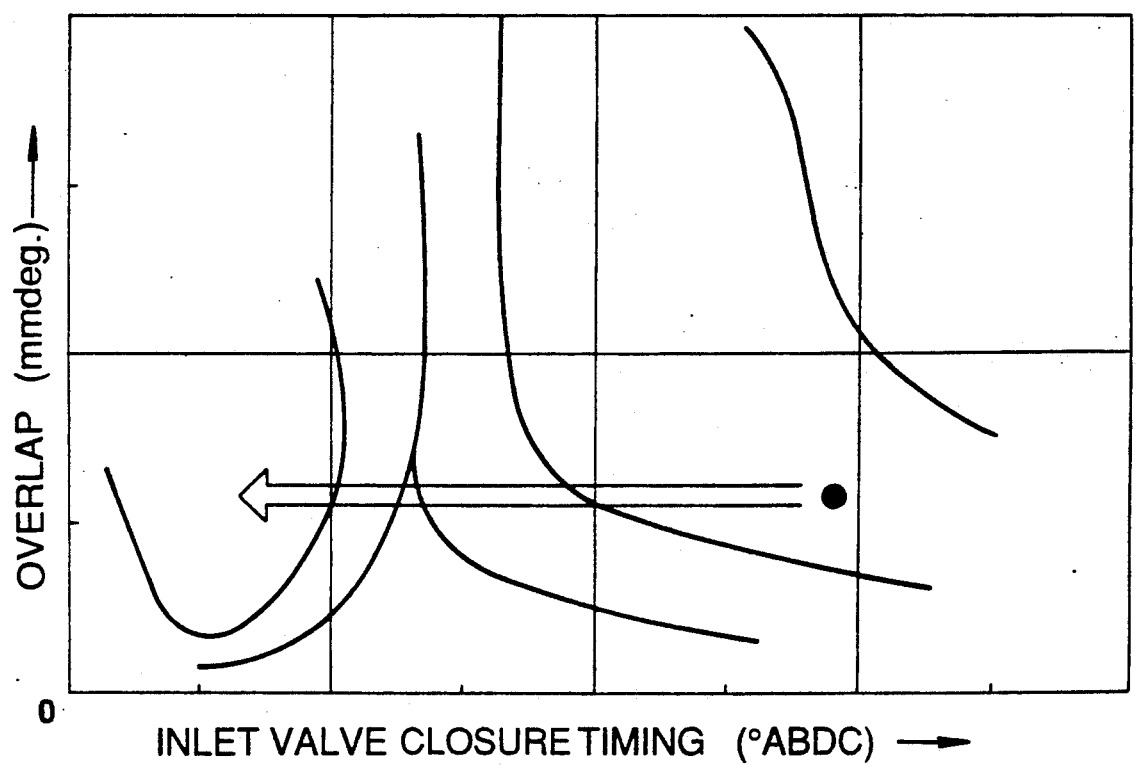
FIG. 7 is a graph which shows in terms of valve overlap and inlet valve timing the icombustion characteristics which are possible with the present invention.

FIG. 7 shows the effect of varying valve overlap by changing the lift timing. The large arrow leading from the black dot in this figure indicates a direction in which combustion characteristics improve.

FIG. 8 is a table which is logged in terms of torque and three parameters inlet/outlet valve overlap, inlet valve closure timing and inlet valve lift amount. As will be seen the torque is classified into stable idling, partial load, low to medium speed torque and maximum torque levels.

By way of example, as shown in FIG. 7, when the throttle is fully open and maximum torque output is required, as the engine speed increases it is necessary to delay the valve closure and increase the amount of valve overlap. On the other hand, during partial load, in order to improve combustion, as the load is relatively small it is necessary shift the timing in the manner indicated by the bold arrow and thus hasten the time the inlet valve is closed. When the engine is idling it is required to minimize the amount of inlet/outlet valve overlap so as to promote stable engine running under this operational mode.

Figure 9:
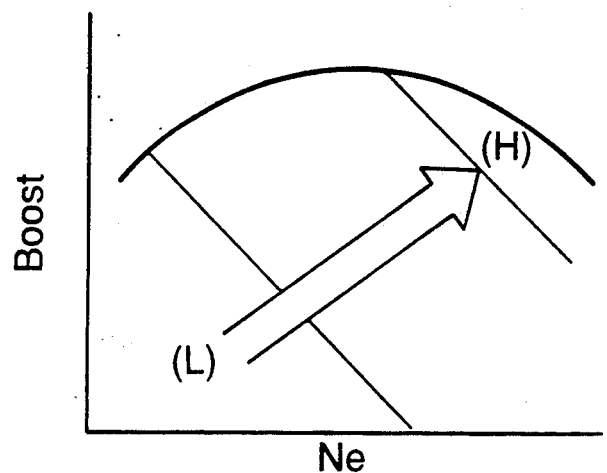
FIGS. 9 and 10 are graphs which show in terms of induction boost pressure and engine speed the changes which occur in connection with valve lift and inlet valve timing in accordance with the present invention.
Figure 10:
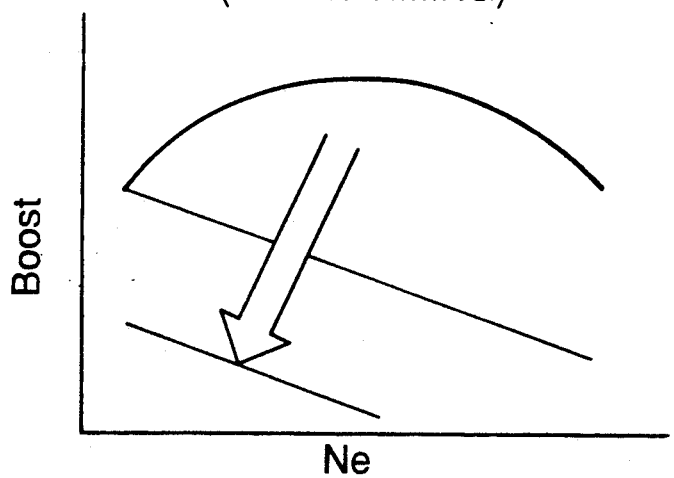

FIGS. 9 and 10 individually show the characteristics which are listed in the table of FIG. 8 and which are depicted in FIGS. 4 and 5. The graphs shown in these figures are expressed in terms of engine speed and boost pressure (induction pressure). FIG. 9 shows the required change in lift characteristics while FIG. 10 shows the required change in lift timing.

While it is understood that FIGS. 4 and 5 show the form in which the data is recorded in the instant embodiment, it is within the scope that other embodiments could be devised wherein the data is recorded in the form shown in FIGS. 9 and 10.

Figure 11:
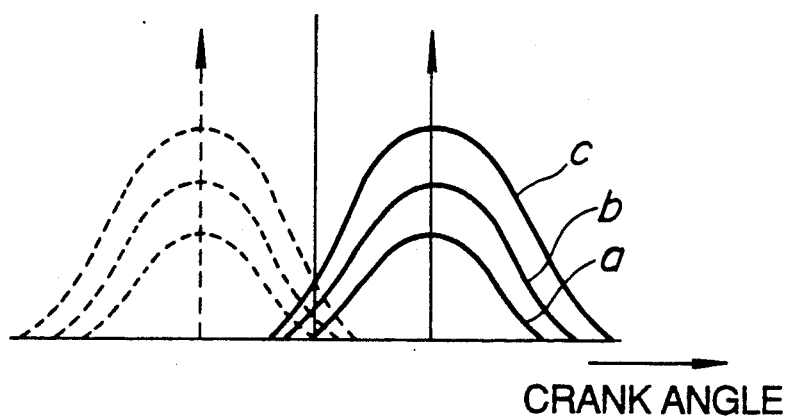
FIGS. 11 and 12 show the valve lift characteristics which occur under full an partial load operation.
Figure 12:
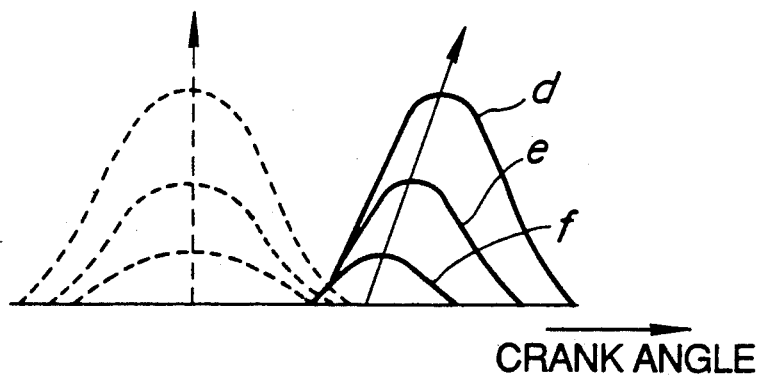
Figure 14:
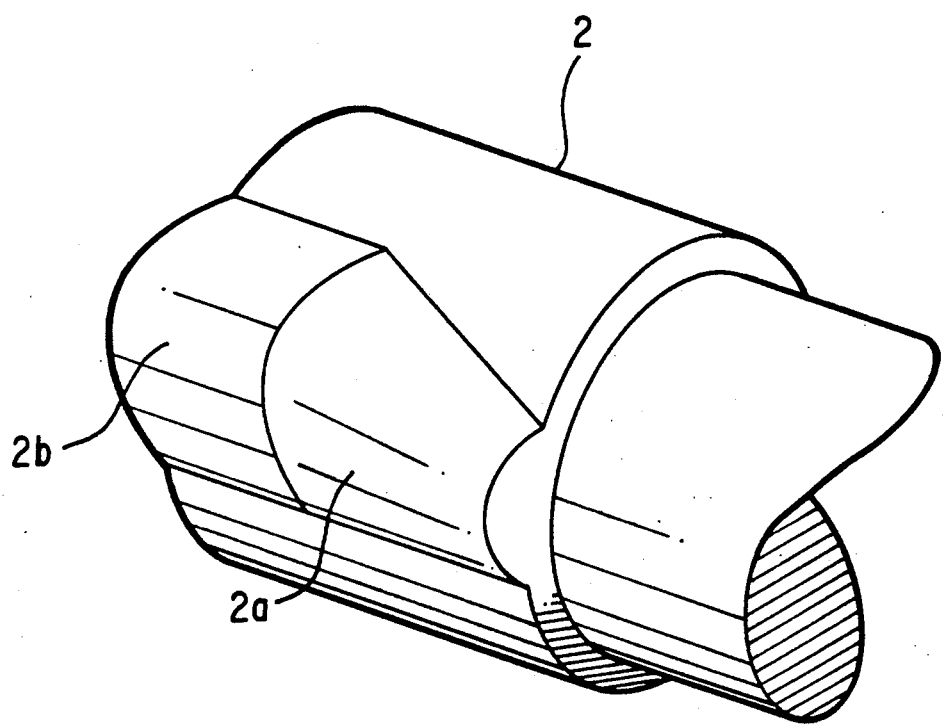
FIG. 14 shows the two region cam lobe configuration of the embodiment of the instant invention applied to the prior art VVT arrangement discussed in the instant disclosure.

It should be noted that the control characteristics which are depicted in FIGS. 4 and 5 are divided into a number of different driving modes. It should be further noted that the cams 2 are configured in a manner shown in FIG. 14 wherein, until the the cam shaft 6 axially is displaced by a predetermined amount away from actuator 8 the contour of the portion 2a of the cam 2 which actually engages the cam followers 4 changes with axial displacement of the cam shaft 6 on which they are formed in a manner whereby, the amount of lift increases and simultaneously the closure timing of the valve is delayed (viz,. shifts from f-e-d as shown in FIG. 12). From this stage, as further axial displacement is induced, the portion 2b of the cam 2 engages the cam followers 4 the opening timing becomes essentially fixed and the amount of lift alone increases (viz., the lift increases from a-b-c as shown in FIG. 11).

Accordingly, when the engine is started and the pressure in the control chamber 14 is inherently low the cams are located in positions which induce the lift characteristics shown by trace "f" in FIG. 12. These characteristics, as will be appreciated from FIGS. 6 and 7, are such as to ensure that the amount of valve overlap between the inlet and outlet valves are minimized and engine aspiration is such as to induce stable idling.

As the engine throttle valve is opened and/or the engine speed is increased, the amount of hydraulic fluid which is supplied from the control valve 100 to the control chamber 14 is increased. The amount of fluid which is supplied is controlled in accordance with the schedules shown in FIGS. 4 and 5. Accordingly, if the load on the engine is increased into the partial zone the control valve 100 is conditioned to supply hydraulic fluid at a rate which induces the cam shaft to be moved axially away from the actuator 8 to the degree that the amount of lift and valve closure timing is such as indicated by trace "e" in FIG. 12 for example. Further increases in the amount of hydraulic fluid supplied results in the lift characteristics of the valve selectively changing from those indicated by trace "d" in FIG. 12 to those indicated by traces "a", "b", and "c".

In accordance with this control it is possible to set the valve lift and timing in a manner which optimizes engine operation.

Although, the above disclosure has been given in connection with the inlet valve or valves of an engine, it is within the scope of the present invention to apply the same technique to the exhaust valves or both the induction and exhaust valve trains. Of course in the case of exhaust valve control the schedules would have to be compiled in a slightly different manner. However, equipped with the instant disclosure, it is deemed well within the purview of one skilled in the art to which the instant invention pertains to compile the same.

What is claimed is:

1. In an internal combustion engine
a first sensor for sensing engine speed;
a second sensor for sensing engine load;
a cam shaft;
an actuator operatively connected with said cam shaft, said actuator being arranged to axially displace said cam shaft in its axial direction;
a control unit operatively connected with said first sensor, said second sensor and said actuator, a control circuit including a control schedule which is recorded in terms of engine speed and engine load and which is divided into a plurality of control zones, each of said control zones determining the amount of axial displacement which is induced in said cam shaft by said actuator; and
a cam fixedly disposed on said cam shaft, said cam having a predetermined configuration and arranged to actuate a valve means, said cam having first and second sections, said first section being arranged to simultaneously induce different lift and different valve closure timing as it is moved relative to said valve means by the axial displacement of said cam shaft within a first axial displacement predetermined range, said second section being arranged to induce increasing amounts of valve lift with essentially the same valve closure timing as it is moved relative to said valve means by the axial displacement of said cam shaft within a second predetermined axial displacement range.

2. An internal combustion engine as claimed in claim 1 wherein said actuator is hydraulically operated and which further comprises a control valve, said control valve being arranged to control the supply of hydraulic fluid of said actuator and operatively connected with said control circuit in a manner to be controlled thereby.

* * * * *